United States Patent
Pfrengle et al.

(10) Patent No.: US 12,010,424 B2
(45) Date of Patent: Jun. 11, 2024

(54) OPTOELECTRONIC SENSOR AND METHOD FOR FOCUS ADJUSTMENT

(71) Applicant: SICK AG, Waldkirch (DE)

(72) Inventors: Thomas Pfrengle, Waldkirch (DE); Jakob Burger, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/202,113

(22) Filed: May 25, 2023

(65) Prior Publication Data

US 2023/0421897 A1    Dec. 28, 2023

(30) Foreign Application Priority Data

Jun. 24, 2022    (EP) .................................... 22180971

(51) Int. Cl.
   H04N 23/67    (2023.01)
   G01D 5/14    (2006.01)
   G06K 7/14    (2006.01)
   H02K 37/00    (2006.01)
   H02K 41/035    (2006.01)

(52) U.S. Cl.
   CPC ............ H04N 23/67 (2023.01); G01D 5/142 (2013.01); G06K 7/1413 (2013.01); H02K 37/00 (2013.01); H02K 41/0354 (2013.01)

(58) Field of Classification Search
   CPC ...... H04N 23/67; G01D 5/142; G06K 7/1413; H02K 37/00; H02K 41/0354
   See application file for complete search history.

(56) References Cited

U.S. PATENT DOCUMENTS

| | | | |
|---|---|---|---|
| 5,101,278 A | 3/1992 | Itsumi et al. | |
| 5,245,172 A | 9/1993 | Esslinger et al. | |
| 5,969,760 A | 10/1999 | Ernest et al. | |
| 7,419,467 B2 | 9/2008 | Tsai | |
| 2008/0062301 A1* | 3/2008 | Zhou ........................ | G03B 3/10 |
| | | | 348/345 |
| 2010/0283887 A1 | 11/2010 | Topliss et al. | |
| 2014/0093228 A1 | 4/2014 | Gredegard et al. | |
| 2015/0070565 A1* | 3/2015 | Furusawa ................ | G02B 7/08 |
| | | | 348/348 |

(Continued)

FOREIGN PATENT DOCUMENTS

| | | | |
|---|---|---|---|
| DE | 102016112123 A1 | | 1/2018 |
| EP | 0757270 B1 | | 12/2003 |

(Continued)

OTHER PUBLICATIONS

European Search Report dated Mar. 29, 2023 corresponding to application No. 22180971.8-1020.

(Continued)

*Primary Examiner* — Thanh Luu
*Assistant Examiner* — Monica T Taba
(74) *Attorney, Agent, or Firm* — Nath, Goldberg & Meyer; Jerald L. Meyer (57) ABSTRACT

An optoelectronic sensor comprising a light receiver, receiving optics in front of the light receiver, and a focus adjustment unit having an actuator and configured to move the light receiver, wherein the focus adjustment unit comprises a parallel guide having at least one flexible retaining element and moving the light receiver in a constant orientation on the optical axis of the receiving optics.

18 Claims, 4 Drawing Sheets

(56) References Cited

U.S. PATENT DOCUMENTS

| | | | |
|---|---|---|---|
| 2016/0178923 A1 | 6/2016 | Hayashi | |
| 2018/0347921 A1* | 12/2018 | Morrison | H01L 23/3733 |
| 2019/0141248 A1* | 5/2019 | Hubert | H04N 23/687 |
| 2020/0174218 A1* | 6/2020 | Schneider | G06K 7/1439 |
| 2020/0196452 A1* | 6/2020 | Lee | G06F 3/04164 |
| 2021/0080807 A1 | 3/2021 | Sharma | |

FOREIGN PATENT DOCUMENTS

| | | |
|---|---|---|
| EP | 1513094 B1 | 3/2005 |
| EP | 1698996 A1 | 9/2006 |
| EP | 2112540 A1 | 10/2009 |
| EP | 3525026 A1 | 8/2019 |
| EP | 3663846 A1 | 6/2020 |

OTHER PUBLICATIONS

European Search Report dated Dec. 6, 2022 corresponding to application No. 22180971.8-1020.

* cited by examiner

| Zone | Spring Steel | Spring Steel with Al Composite | B-Copper | B-Copper with Al Composite | Double Spring Al with B-Copper and Al Composite |
|---|---|---|---|---|---|
| Short Region | 76,53 | 76,53 | 7,65 | 7,65 | 3,44 |
| Long Region | 1011,28 | 3,96 | 101,13 | 3,96 | 3,96 |
| Short Region | 76,53 | 76,53 | 7,65 | 7,65 | 3,44 |
| Strength [S] | 1164,34 | 157,02 | 116,43 | 19,26 | 10,84 |

Figure 10

OPTOELECTRONIC SENSOR AND METHOD FOR FOCUS ADJUSTMENT

The invention relates to an optoelectronic sensor, in particular a camera, and to a method for adjusting the focus of an optoelectronic sensor.

Cameras are used in a variety of ways in industrial applications, among others, to automatically record object properties, for example, to inspect or measure objects. In doing so, images of the object are recorded and evaluated, according to the task, by image processing methods. Another application of cameras is reading codes. An image sensor is used to record objects with the codes on them, identify the code regions in the images, and then decode them. Camera-based code readers can also easily handle types of code other than one-dimensional barcodes, which, like a matrix code, also have a two-dimensional structure and provide more information. Automatic text capture from printed addresses (OCR, optical character recognition) or handwriting is also, in principle, code reading. Despite this greater variety of camera-based code readers, specialized barcode scanners, which are generally less expensive for the same reading performance, are still widely used. Typical applications of code readers are supermarket checkouts, automatic package identification, mail sorting, airport baggage handling, and other logistics applications.

A common recording situation is the mounting of a code reader or camera for inspection or surveying tasks above a conveyor belt. The camera records images during the relative movement of the object stream on the conveyor belt and stores the recorded information or initiates further processing steps as a function of the object properties obtained. Such processing steps may consist of further processing, adapted to the specific object, on a machine that acts on conveyed objects, or in a change of the object stream, in that certain objects are discharged from the object stream as part of quality control, or the object stream is sorted into several partial object streams. A code reader identifies the objects for correct sorting or similar processing steps based upon the attached codes.

In order to deal with various working distances and in particular to be able to read codes at different distances, the focus position must be adjusted. This is often combined with autofocus, which determines the distance to the object to be recorded and adjusts the focus position accordingly. Different technologies are known for focus adjustment. Typically, the position of the objective lens and thus the image crop is changed to achieve refocusing.

For example, EP 2 498 113 A1 proposes a focus adjustment for a camera-based code reader using a motor-driven cam disk and a parallel guide for the objective lens in a spring mount that has several flat leaf springs. The disadvantage of this is the mechanical wear, which increases with the weight of the objective lens. This limits the objective lens selection to smaller objective lenses. A larger objective lens not only brings more wear, but also requires an adjustment of the mechanics, such that the formation of variants is complex.

In US2016/0178923 A1, an autofocus lens holder is held between two leaf springs that have a central opening for the lens holder that moves along the optical axis. Such focus adjustment brings no improvement in terms of weight pragmatics and, moreover, has a complex and bulky structure.

EP 757 270 B1 deals with an autofocus device in which a lens carrier with lenses moves elastically axially in a mechanical guide consisting of two leaf spring apertures arranged parallel to each other and perpendicular to the optical axis of the lenses. However, the guiding and force distribution characteristics of this arrangement do not reach those of a parallel guide as in EP 2 498 113 A1.

To reduce wear, a voice coil can be used as an actuator. Moving coils are used, for example, in single-lens reflex cameras for image stabilization. DE 10 2016 112 123 A1 discloses a barcode scanner with transmitting optics on a swivel arm that, to focus the reading beam, is swiveled with a plunge coil actuator. This is initially suitable only for a less complex transmitting lens, and not for a receiving lens. In addition, the circular movement of the swivel arm causes an offset between the transmitting optics and the light transmitter, and such offset, transferred to a receive path, would result in considerable optical losses.

EP 3 525 026 A1 describes a focus adjustment that moves the objective lens between two rolled leaf springs. EP 3 663 846 A1 discloses an objective lens suspension with two, frame-shaped spring elements. In both cases, a moving coil is provided as an actuator. This improves service life in each case, because a wear-prone cam disk or a comparable mechanical transmission element is not required. However, if a different objective lens with a higher mass is to be used, the actuator with the moving coil must be redesigned. Thus, objective lens variants are still uneconomical.

To avoid having to move objective lenses of larger or, in any case, different objective lens masses, there is in the prior art the idea of moving the image sensor instead. EP 1 513 094 B1 describes a code reader in which the light receiver is arranged on a swivel arm, the movement of which changes the distance to a fixed-position receiving optics in order to adjust the focus position. However, not only the image crop changes, but also the optical axis of the light receiver in relation to the receiving optics, such that each focus adjustment leads to different imaging errors. EP 1 698 996 B1 varies the concept in that the image sensor is not housed on the swivel arm itself, but on a spring arm coupled to it. As a result, the image sensor changes its orientation when the focus is adjusted, and this partially, but not completely, avoids the imaging errors.

EP 2 112 540 A1 arranges the receiving optics on a rocker arm. This causes the recording region to shift when the focus position is changed. In the limited application of EP 2 112 540 A1, with line-shaped recording, such shifting can be aligned parallel to such line-shaped recording, and then, ultimately, does not interfere. However, this is not transferable to general cameras and their applications. Finally, it is mentioned that, instead of the receiving optics, the light receiver can be movably arranged with a rocker arm, without explaining this in more detail.

U.S. Pat. No. 7,419,467 discloses a medical examination device having an autofocus module that moves the image sensor relative to the lens. US 2014/0093228 A1 mentions both options of using a focus motor to move the focus lens or sensor region. U.S. Pat. No. 5,101,278 presents an autofocus device for a video camera and initially discusses that the image sensor can be moved instead of the lens group, for more compactness. U.S. Pat. No. 5,245,172 deals with a focus system based upon a moving coil, in which the image receiver is arranged on a rotatable and tiltable frame. In each case, no thought is given to deeper mechanical or optical consequences.

In the prior art, lenses with variable focal length—in particular, liquid lenses—which do not require any macroscopic shifting of components, are known. Liquid lenses are by no means freely available for all objective lens series on the market. If one restricts oneself to available liquid lenses with small apertures, use in larger objective lenses is not possible. Regardless of the availability of liquid lenses, complex temperature compensations are required, and liquid lenses are, on the whole, unsuitable for low temperature applications. Since a liquid lens typically supplements rather than replaces the objective lens, additional installation space for the liquid lens must be provided in the design. When creating variants, individual adjustments are required for the respective objective lens and the matching liquid lens.

In summary, despite the many different approaches, the prior art so far offers only insufficient possibilities for a focus adjustment that supports a large number of objective lenses, in particular, larger and heavier ones.

It is therefore an object of the invention to further improve the focus adjustment of an optoelectronic sensor.

This object is satisfied by an optoelectronic sensor comprising a light receiver, receiving optics in front of the light receiver, and a focus adjustment unit having an actuator and configured to move the light receiver, wherein the focus adjustment unit comprises a parallel guide having at least one flexible retaining element and moving the light receiver in a constant orientation on the optical axis of the receiving optics.

The object is also satisfied by a method for adjusting the focus of an optoelectronic sensor comprising a light receiver and receiving optics arranged in front of the light receiver, wherein the light receiver is moved by means of a focus adjustment unit using an actuator, wherein the focus adjustment unit moves the light receiver in constant orientation on the optical axis of the receiving optics by means of a parallel guide having at least one flexible retaining element.

The sensor has a light receiver, preferably in the form of a line-shaped or matrix-shaped image sensor, the sensor thus being a camera. An associated receiving optics or a receiving lens ensures sharp recording. For refocusing, a focus adjustment unit having an actuator moves the light receiver. The movement changes the back focal length, and thus the focus position. Consequently, it is not the receiving optics that are moved, as is generally the case, but the light receiver or a printed circuit board with the light receiver. The receiving optics or at least one element thereof can additionally be moved, but preferably only the light receiver moves relative to the receiving optics, and the receiving optics remain stationary. Here, movement is always meant in the camera's frame of reference. The camera as a whole could also move in particular in mobile applications, but that does not change the focus setting. Throughout this specification, the term preferably refers to an advantageous, but entirely optional feature.

The invention starts from the basic idea of moving the light receiver in a constant orientation on the optical axis of the receiving optics, i.e. to perform a parallel shifting as a movement. Thus, the light receiver is not tilted and is not placed in different inclined positions. The constant orientation preferably keeps the plane of the light receiver always perpendicular to the optical axis. Preferably, the lateral positioning is also maintained; the piercing point of the optical axis on the light receiver then does not change due to the movement. The constant orientation is achieved by a parallel guide of the focus adjustment unit with at least one flexible retaining element. The parallel shift is not meant in a mathematically perfect sense, but in a practical sense. Minor tilting and lateral shiftings within tolerances and the like remain possible as long as the corresponding optical changes and errors are acceptable.

The invention has the advantage that, with the light receiver, only a comparatively small mass has to be moved compared to objective lenses. This minimizes wear, or even largely eliminates it, depending upon the actuator, and thus extends service life. This eliminates the need to adapt or redesign the focus adjustment unit, and the same focus module can be used for different classes of equipment and a great many objective lens variants. In contrast to the highly varying weights of objective lenses, even changing the light receiver hardly changes the weight significantly, in particular since image sensors with different pixel resolutions are often sold as pin-compatible in the same package. The consistency of the mechanical design platform for focus adjustment reduces development and manufacturing costs, and increases the number of variants. Only the objective lens flange and the distance to the optical surface are standardized. This means that practically any objective lenses with a wide variety of focal lengths, apertures, and other optical properties can be combined, not only on the part of the sensor manufacturer, but even on the part of the customer, wherein the various objective lenses may be freely procured on the market or offered as accessories. So, depending upon the requirements, particularly high-quality or, conversely, less expensive but perfectly adequate objective lenses, may be used. The disadvantages associated with liquid objective lenses have also been overcome, and there is no dependence upon liquid lens manufacturers or special objective lenses designed to work with a particular liquid lens.

The actuator preferably comprises a stepper motor or a moving coil. A stepper motor is a proven and readily available component. A moving coil actuator (voice coil) has the advantage that no or at least less mechanical wear occurs, because the force transmission remains contactless. Optionally, the coil may be stationary, and the magnet may be moved, or vice versa. The coil or the magnet may be integrated on a printed circuit board of the light receiver, for a particularly compact arrangement.

The sensor preferably comprises a position sensor for determining the position of the actuator, the parallel guide, or the light receiver. A Hall sensor can be used as a position sensor, for example. Depending upon the embodiment, the position of the actuator, the parallel guide, or the light receiver is measured, all of which are interrelated in a known manner and therefore ultimately provide the same measurement information, viz., feedback on the adjusted focus position. In combination with distance measurement or image sharpness determination, focus control or autofocus can be implemented.

The light receiver is preferably arranged on a printed circuit board that comprises at least one flexible section. The printed circuit board is therefore a flex board. The flexibility makes it possible to keep the printed circuit board, and thus the light receiver, connected to the other electronic components of the sensor in the various positions of movement.

The printed circuit board preferably comprises rolled copper at least in the flexible section. This provides mechanical stability of the at least one flexible section, which can withstand the many thousands or even millions of bends in the course of focus adjustments over the service life of the sensor.

The parallel guide preferably comprises a fixed first bearing and an opposing, movable second bearing, wherein the flexible retaining element is mounted with a first side in the first bearing and with an opposing second side in the second bearing. The flexible retaining element is thus mounted in a fixed or stationary manner on one side and is moved up and down by the actuator on the other side for focus adjustment.

The light receiver is preferably at least indirectly rigidly connected to the second bearing and flexibly or not at all connected to the first bearing. "At least indirectly" means in particular that it is not the light receiver itself, but its printed circuit board, that is connected. The connection to the movable second bearing is rigid, i.e., the light receiver follows the movements of the flexible retaining element on its side and is raised and lowered here by the actuator for focus adjustment. At the opposite fixed first bearing, either a flexible connection of the light receiver provides sufficient clearance to allow its rigid movement or parallel shifting, or there is no connection at all here, so as not to restrict the movement. Such properties concern the mechanical connection. The electrical connection is preferably made via a flexible section of a printed circuit board, which can provide the flexible connection to the first bearing. Alternatively or additionally, a flexible section with electronic contact can be provided beyond the second bearing.

The at least one flexible retaining element is preferably configured as a frame around the light receiver or its printed circuit board. This is to be understood from a top view of the light receiver, which, in this perspective, is framed by the flexible retaining element. With the focus adjustments, the frame bends, causing the light receiver to be shifted parallel and thereby possibly at least partially shifted out of the frame in a direction vertical to the light receiver, along the optical axis.

The at least one flexible retaining element preferably comprises at least one leaf spring. This is a low-cost component that is easy to manufacture in a suitable shape and still meets all requirements. Alternatively, dowel pins in spring-loaded bearing bushings would also be conceivable, for example.

The parallel guide preferably comprises two flexible retaining elements, wherein the light receiver is arranged between the two flexible retaining elements. The light receiver is thus framed in the direction vertical to the light receiver, along the optical axis, by one flexible retaining element at the top and one at the bottom. This enables a particularly simple and robust realization of the parallel guide.

The at least one flexible retaining element preferably has a thermally-conductive metal, in particular copper or a copper-beryllium alloy. The heat dissipation of the actuators, the moving parts, and the light receiver poses special challenges. Highly thermally-conductive metal such as copper or a copper-beryllium alloy can at least partially mitigate this problem.

The at least one flexible retaining element preferably comprises at least one rigid region in which the material is thickened, in particular by means of at least one additional metal strip. The flexible retaining element thus does not bend over its full length, but only in at least one bending region. Accordingly, there is a rigid region where the material can be thickened without affecting the required bending properties. Thus, the thermal conduction is improved, at least over the part of the section of the rigid region. The additional material improves thermal conduction even if it does not have outstanding thermal conduction properties per se, such as low-cost aluminum. Material of high thermal conductivity, such as copper or a copper-beryllium alloy, is particularly preferred. In terms of design, thickening is achieved particularly simply by attaching at least one metal strip, e.g., two metal strips, from above and below.

The at least one flexible retaining element preferably comprises an additional thermally-conductive layer, in particular a graphite foil. In the bending regions, it is not possible to thicken the material without impairing or even losing the bending properties. A thin, thermally-conductive layer provides a remedy here, and a graphite foil has proven to be particularly suitable for this purpose. The thin, thermally-conductive layer is effectively needed only in the bending regions, but it can also be provided in the rigid region or anywhere in the flexible retaining element, which also simplifies manufacturing.

The at least one flexible retaining element preferably has two metal layers with the thermally-conductive layer in-between, in particular a graphite foil. The thermally-conductive layer is thus located in the center, preferably in the position of the so-called neutral fiber, in order to be exposed to the lowest possible forces when the flexible retaining element is bent. Otherwise, e.g., in the case of an outer thermally-conductive layer, there is a risk that the thermally-conductive layer, in particular a thin graphite foil, will tear due to the focus adjustments. By placing it in the center, such risk is significantly reduced. A small crack in the interior is also largely non-critical, since the edges of the crack remain close together, and at most a small, surmountable gap with poorer thermal conductivity is created. A film applied to the outside, on the other hand, could tear off completely.

The sensor preferably has a control and evaluation unit that is configured to read out code information of a recorded code from image data recorded with the light receiver. The sensor thus becomes a code reader. If the light receiver is an image sensor, it is a camera-based code reader. Due to the focus adjustment according to the invention, sharp images are recorded over a long service life with countless read cycles and thus focus cycles, thus creating the conditions for a high read rate.

The method according to the invention can be varied in a similar manner and shows similar advantages. Such advantageous features are described by way of example, but not exhaustively, in the dependent claims following the independent claims.

Figure 1:
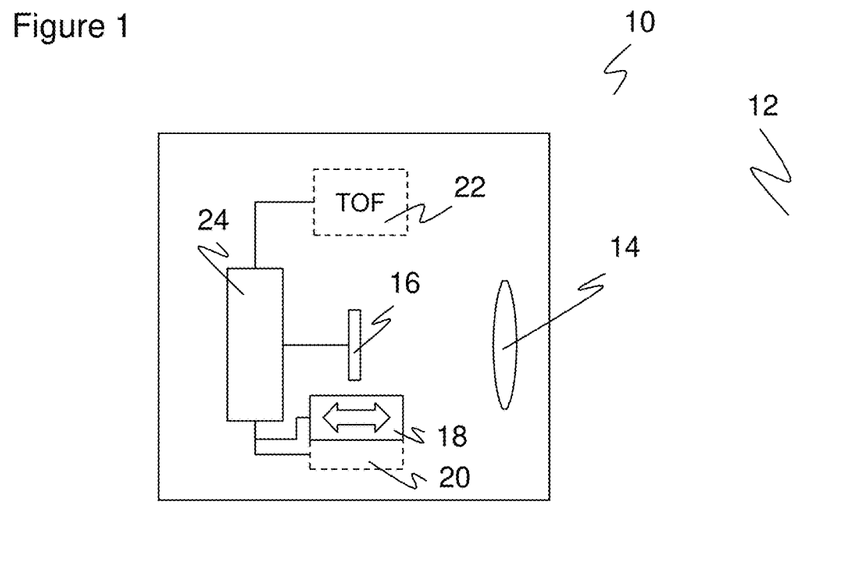
FIG. 1 a block diagram of an optoelectronic sensor designed as a camera.

The invention is explained in more detail below, also with respect to further features and advantages, by way of example based upon embodiments and with reference to the attached drawing. The figures of the drawing show:

FIG. 1 shows a block diagram of a camera as an example of an optoelectronic sensor 10 with focus adjustment. The camera can be designed as a 2D camera or a 3D camera.

Received light from a recording region 12 impinges on receiving optics 14 that guide the received light to a light receiver 16. The receiving optics 14 are shown here purely schematically as a single lens. In general, it is any objective composed of lenses and other optical elements such as apertures, prisms, and the like, and only in the simplest embodiments is a single lens. In the case of a camera, the light receiver 16 is an image sensor having a plurality of light-receiving elements in a row or matrix arrangement. Other sensors 10 use a photodiode, an APD (avalanche photodiode), or even a SPAD (single-photon avalanche diode) receiver.

To focus the sensor 10, the light receiver 16 can be moved along the optical axis of the receiving optics 14. This varies the back focal length and thus causes a change in the focus position. A focus adjustment 18 is responsible for such refocusing, which is shown purely symbolically in FIG. 1, and which is explained in more detail below with reference to FIGS. 2-9. By moving the light receiver 16, rather than the receiving optics 14 as would otherwise be the case, the same focus adjustment 18 is capable of interacting with a wide variety of objective lenses. This means that the objective lens with the desired optical properties can be used as the receiving optics 14 for the respective application; mass and size are irrelevant for the focus adjustment 18.

An optional, and therefore shown with dashed lines, position sensor 20 provides feedback on the currently adjusted focus position. For example, the position sensor 20 can be a rotary Hall encoder on a motor shaft of a motor that drives the movement of the light receiver 16, or alternatively a linear Hall encoder for directly determining the position of the light receiver 16 or a component moved with the light receiver 16. An additional sensor element and, in particular, a Hall element can additionally detect the respective maximum deflections.

Furthermore, a distance sensor 22 can be provided, optionally and therefore shown with dashed lines, which in each case determines the distance to an object to be recorded and thus the required focus position. The distance sensor 22 is designated TOF for a preferred time of flight (TOF) distance measurement method. Alternatively, any distance measurement known per se is possible.

A control and evaluation unit 24 is connected to the light receiver 16, the focus adjustment 18, and, if present, the position sensor 20 and the distance sensor 22. The control and evaluation unit 24 comprises at least one computation unit, such as a CPU, an FPGA, an ASCI or a similar digital component. A received signal from the light receiver 16 is read out by the control and evaluation unit 24 and, for example, stored as an image, prepared and processed using image evaluation methods, or examined in a camera-based code reader for code regions that are then decoded. The focus adjustment 18 is used to adjust the required focus position. The information about the required focus position is provided by the distance sensor 22. With the feedback of the position sensor 20 regarding the actual focus position, a control loop or autofocus can be realized.

Figure 2:
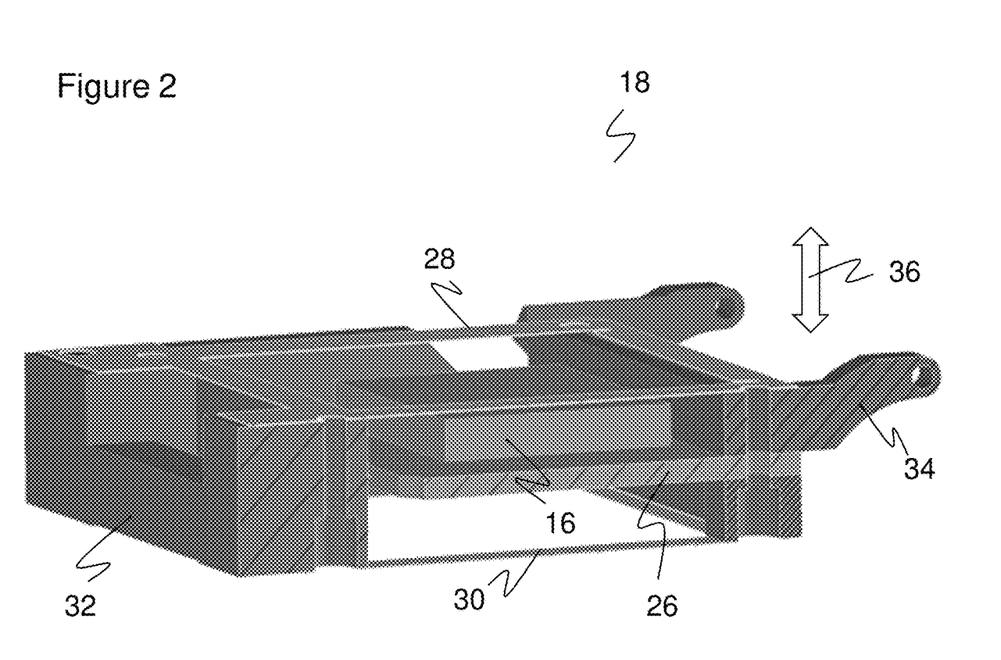
FIG. 2 a three-dimensional illustration of a focus adjustment of an optoelectronic sensor by moving the light receiver in a parallel guide.

FIG. 2 shows a three-dimensional illustration of one embodiment of the focus adjustment 18. The light receiver 16 is housed on a printed circuit board 26, which in turn is positioned between a first leaf spring 28 arranged above and a second leaf spring 30 arranged below. The two leaf springs 28, 30 each have a rectangular shape that in a top view frames the light receiver 16. They are mounted on one side, in particular narrow side of the rectangle, in a fixed bearing 32 and on the other side in a movable bearing 34. The movable bearing 34 is moved up and down in the direction of the arrow 36 by an actuator system for focus adjustment.

The printed circuit board 26 is also mounted on its one side in the movable bearing 34 and therefore follows the up-and-down movement. It is parallel-shifted in the process, thus retaining its orientation in its receiving plane along with its lateral position within the receiving plane. On the opposite side, the printed circuit board 26 is connected to the fixed bearing 32 via a flexible printed circuit board region or not at all, in order to allow relative movement to the fixed bearing 32 and thus parallel shifting. The flexible printed circuit board region provides for the electronic connection of the printed circuit board 26. Alternatively or additionally, a flexible electronic connection can be made at another location, in particular beyond the movable bearing 34 with a flexible printed circuit board region. The parallel guide shown using two leaf springs 28, 30 is particularly advantageous, but other concepts are conceivable, such as up-and-down movement between dowel pins and bearing bushes with springs.

Figure 3:
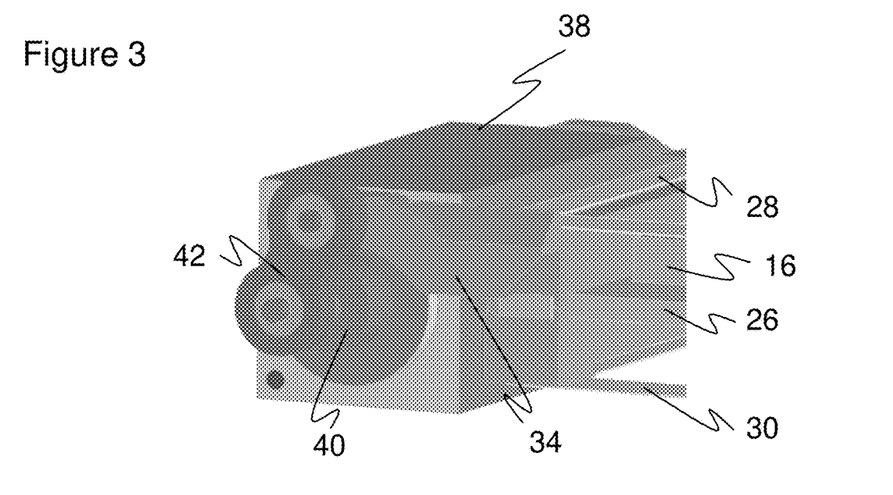
FIG. 3 a three-dimensional illustration of an actuator system for moving the light receiver according to FIG. 2.

FIG. 3 shows a three-dimensional illustration of an actuator system for the up-and-down movement of the movable bearing 34 and thus of the light receiver 16. A ball-bearing-mounted connecting rod 42 is arranged on a stepper motor 38 as an eccentric for converting the rotary movement into a linear movement on its shaft 40, which generates the required stroke movement. The linkage is preferably implemented on both sides to the right and left of the movable bearing 34, in order to raise and lower the printed circuit board 26 evenly. In principle, only one point of incidence would also be conceivable, but this involves the risk that, despite the leaf spring parallelograms, the light receiver 16 tilts by at least a few micrometers, thus shifting the image field. This risk is mitigated or eliminated by a central point of incidence, which is conceivable at least for small designs, and simplifies the design.

Instead of the stepper motor 38, a moving coil actuator (voice coil) is conceivable. Such actuators can be arranged outside, but also inside the frame formed by the leaf springs 28, 30. Both designs with a coil on the fixed part and a magnet on the moving part, and vice versa, are possible. The respective co-moving component, coil or magnet, can be integrated with the light receiver 16 on the printed circuit board 26. For applications where precision is more important than speed, a piezo actuator can be used as another alternative.

Figure 4:
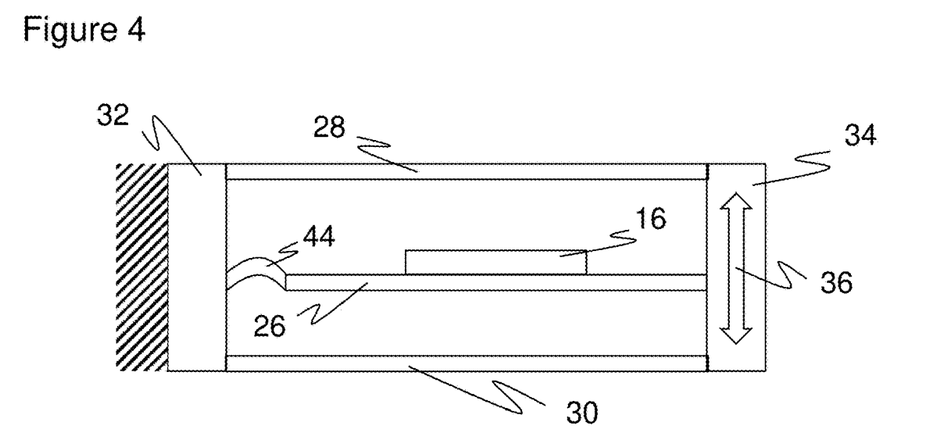
FIG. 4 a schematic side view of the focus adjustment according to FIG. 2 in an initial position.
Figure 5:
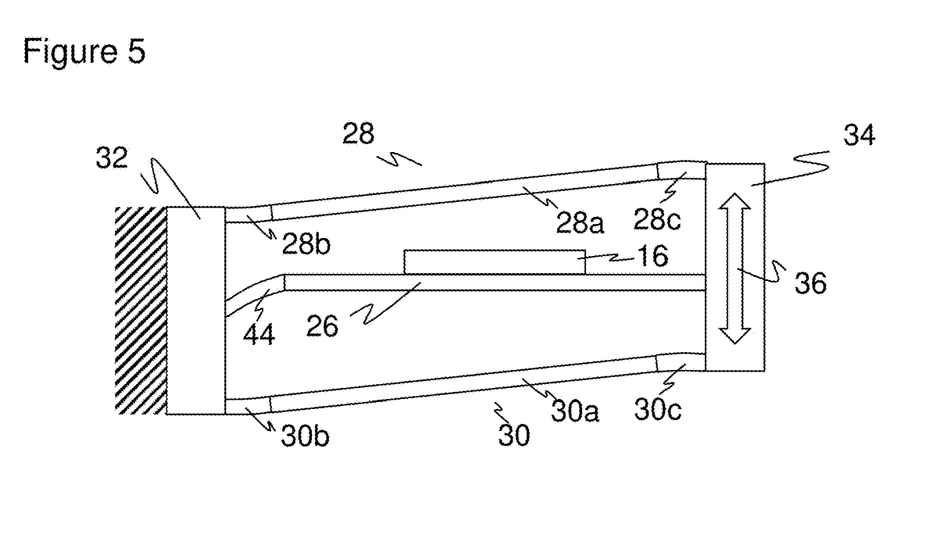
FIG. 5 a schematic side view according to FIG. 4 in a parallel-shifted position.

FIGS. 4 and 5 illustrate the parallel guidance or parallel shifting of the light receiver 16 by the focus adjustment 18 once again in a schematic side view, wherein FIG. 4 shows an initial position, and FIG. 5 shows a position of the light receiver 16 that in contrast is parallel-shifted. The printed circuit board 26 is mounted in the movable bearing 34 and therefore follows its movement. In the embodiment shown, the printed circuit board 26 is a flex board and is connected to the fixed bearing 32 on the opposite side by a flexible section 44. This allows the printed circuit board 26 to move along without changing its orientation or, as a whole, bending. Alternatively, the printed circuit board 26 could remain completely unconnected on this side. Electronic contact is then required elsewhere—preferably via a flexible section, e.g., beyond the movable bearing 34.

It is important that the printed circuit board 26, or rather its flexible section 44, be capable of withstanding a very high number of focus adjustment cycles. For this purpose, a highly flexible design of the printed circuit board 26 is advantageous. One way to achieve the required fatigue strength of the flex board is to use rolled RA copper.

The leaf springs 28, 30 preferably do not bend over their entire length, but have a rigid region 28a, 30a and two bending regions 28b-c, 30b-c in the transition to the bearings 32, 34. The vertical deflection in FIG. 5 may well be excessive; for a focus adjustment over a relatively small distance range as in code reading, even slight movements of the light receiver 16 are sufficient. A parallel guide by means of leaf springs 28, 30 is a preferred embodiment. However, alternatives are also possible; for example, the rigid regions 28a, 30a may be designed, as rigid components with their own springs or dowel pins in spring-loaded bushings of the bearings 32, 34, as bending regions 28b-c, 30b-c.

During operation, heat transport from the light receiver 16 to the housing of the sensor 10 and thus to the outside must be ensured. The required thermal bridges may be formed by the flexible section 44 and the parallel guide or leaf springs 28, 30. Natural convection and radiation usually play only a minor role, which at best may contribute to optimization.

However, the heat flow is severely restricted by the leaf springs 28, 30. For thermal resistance $$R_{th}, R_{th} = \frac{l}{\lambda A}$$

applies, with length l of the thermal path, A its cross-section, and thermal conductivity coefficient A. In the leaf springs 28, 30, the unfavorable configuration of a long thermal conduction path of low cross-section and thermal conductivity coefficient results. Spring steel, e.g., as a material mechanically suitable for numerous movement cycles, has a thermal conductivity coefficient of only 15 W/(m*K). With a power dissipation of, for example, 1.5 W and two leaf springs 28, 30 of 25 mm length, the result is a ΔT of 1,200 K; i.e., effectively, no heat can be dissipated. However, the parameters are initially not variable; in particular, an increase in the cross-section leads to higher forces and premature fracture.

Some progress can be achieved through material optimization. For example, a copper-beryllium alloy improves the thermal conductivity coefficient by a factor of ten. A Δt of 120 K, however, is still clearly too high. Thus, the geometric quantities of length and cross-section of the thermal path must be taken into account. Two possible improvements, which may also be combined with each other, are now presented for this.

Figure 6:
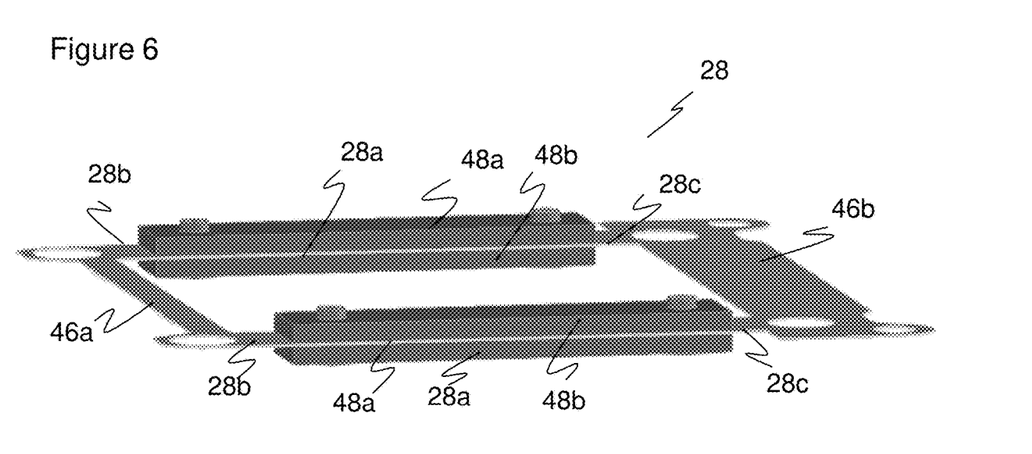
FIG. 6 a three-dimensional view of a leaf spring that can be used in the focus adjustment according to FIG. 2.

FIG. 6 shows a three-dimensional view of the leaf spring 28 in an embodiment with the first improvement in thermal conductivity. The leaf spring 28 is representative of both leaf springs 28, 30, although in principle it would be conceivable to improve thermal conduction, not in both leaf springs 28, 30, as is preferably the case, but only in one leaf spring 28, 30. The thermal conduction at the narrow sides 46a, 46b is not of concern, since here the leaf spring 28 is connected to the respective bearing 32, 34 in a planar manner in any event. In the bending regions 28b-c, the cross-section and mobility should not be changed, if possible. However, in the rigid regions 28a, the material is thickened. In order not to complicate the manufacture of the leaf spring 28, additional material strips 48a, 48b are preferably applied for this purpose, e.g., aluminum strips, and this again on one side or preferably on both sides, as shown. This can be realized in individual parts or also as an inseparable composite. This drastically reduces the original total length of the thermal path with a very thin cross-section over the entire length of the leaf spring 28 to just the length of the bending regions 28b-c. In the numerical example above, the original 25 mm thus becomes only 2 mm, for example. The additional option of using highly thermally-conductive materials still exists.

Figure 7:
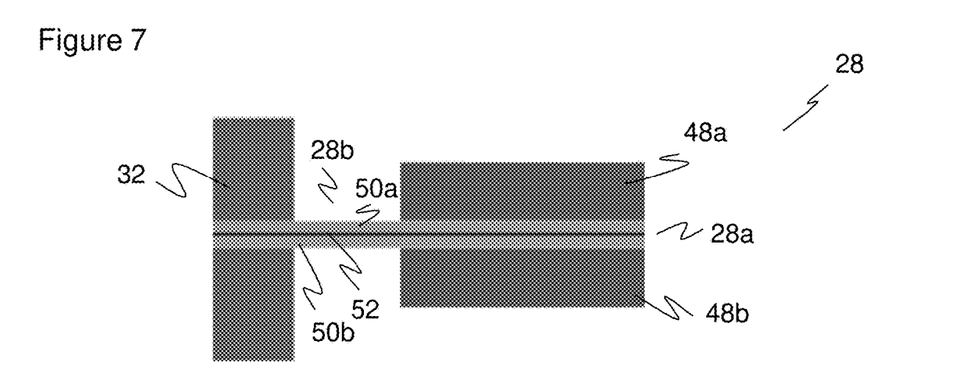
FIG. 7 a schematic, sectional cutaway view of the now mounted leaf spring according to FIG. 6, with a double design with an inner thermally-conductive layer.

FIG. 7 shows a section of leaf spring 28, again representative of both leaf springs 28, 30, in a sectional view illustrating the second possible improvement in thermal conductivity. This second improvement now involves the bending regions 28b-c and not the rigid regions 28a, which may or may not be thickened, depending upon the embodiment, as explained with respect to FIG. 6 and so adopted in FIG. 7. Only one bending region 28b is shown as a representative example.

As mentioned several times, an increase in cross-section in the bending region 28b would have a negative effect upon bending forces and service life. Instead, the leaf spring 28 is designed, at least in the bending region 28b, and preferably everywhere, as a composite of a double spring 50a-b with a highly thermally-conductive core or an inner thermally-conductive layer 52. The thermally-conductive layer 52 is preferably formed by a very thin graphite foil, where, in a numerical example with a thermal conductivity coefficient of 1,600 W/(m*K), a thickness of 0.025 mm may already be sufficient.

Figure 8A:
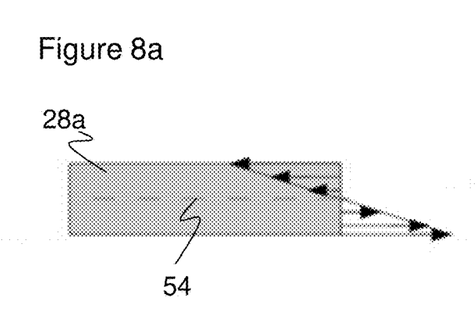
FIGS. 8*a-b* sketches illustrating the forces acting when the leaf spring is bent according to FIG. 7 and the advantages of arranging the inner thermally-conductive layer in the position of the neutral fiber.
Figure 8B:
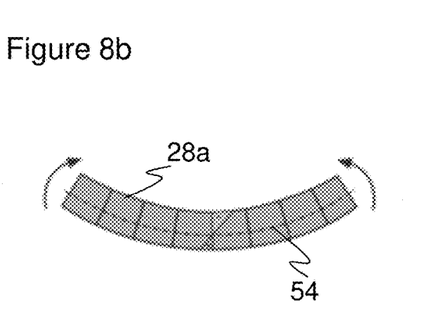

FIGS. 8a-b illustrate the forces acting in the bending region 28a in two sketches in the extended and bent states. The central neutral fiber 54 is subjected to the lowest forces, with additional pressure and tension acting above and below it. Thus, a minimal elongation acts here. In the literature, a cycle number of 100,000 is given for an exemplary graphite foil with a bending radius of 5 mm and bending angle of 90°. Since only bending angles in the range of a few degrees are required for a focus adjustment according to the invention, and a higher bending radius is also possible, the number of cycles is again significantly increased.

If, on the other hand, a graphite foil is placed outside the neutral fiber 54 or even simply on the outside, the elongation quickly becomes too high, and the graphite foil tears off. If, on the other hand, it should happen in the neutral fiber 54 that the graphite foil is overstressed, then any crack here forms only a minimal gap that, moreover, is bridged at the top and bottom by the material of the double spring 50a-b.

Figure 9:
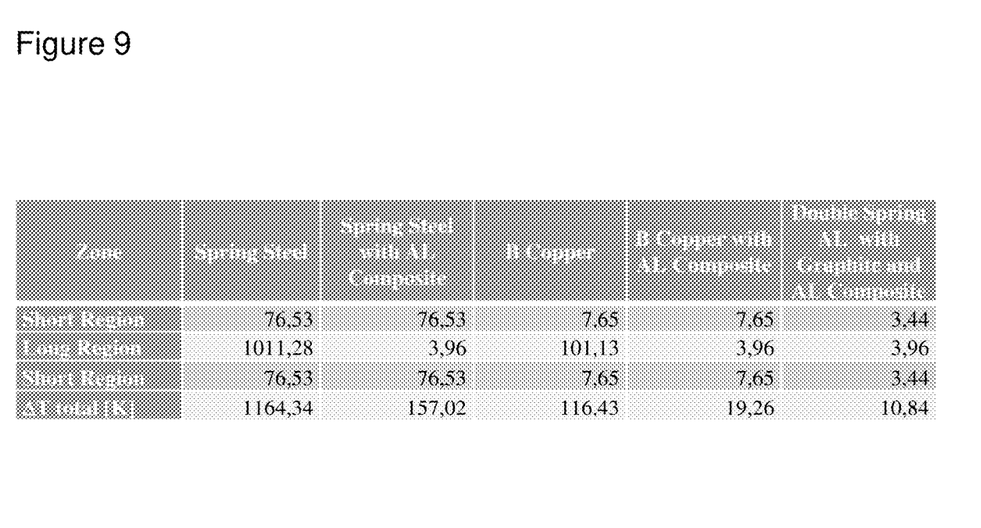
FIG. 9 a table comparing the thermal paths in different embodiments of the focus adjustment.

FIG. 9 showed a table comparing the thermal paths in different designs of the focus adjustment. The estimation is limited to thermal conduction and does not consider other effects such as convection and radiation. The exemplary calculations in each case are based upon the most favorable thermal path without parallel paths, a dissipated power of 1.5 W, a path length of 25 mm with a 2 mm length of the bending regions, and a spring thickness of 0.1 mm. In the lines, the two bending regions 28b-c, 30b-c are considered to be the "short region" and the rigid region 28a, 30a the "long region"; the last line shows the summed ΔT. The first column corresponds to a simple design in spring steel without thermal optimizations; here, with ΔT=1,164, practically no heat is dissipated. In the second column, a composite with aluminum is used as a material strip 48a, 48b in the rigid region 28b, 30b shown in FIG. 6. This reduces the contribution of the rigid region 28b, 30b immensely, but, overall, ΔT=157 still remains too high. The third column in turn corresponds to the simple embodiment of the first column, but now with a highly thermally-conductive beryllium-copper alloy, which improves all contributions by a factor of ten, which, overall, at ΔT=116, is also insufficient. The fourth column combines the measures of the second and third columns and thus already reaches ΔT=19. In the fifth column, both measures presented for FIGS. 6 and 7 are implemented; i.e., the rigid regions 28b, 30b are thickened with aluminum as material strips 48a, 48b, and at least the bending regions 28b-c, 30b-c, or the entire leaf springs 28, 30, are designed as double springs 50a-b with a thermally-conductive layer 52 formed by a graphite foil. This improves again by a factor of two to ΔT=11, not even assuming a beryllium-copper alloy, which is still possible per se.

Figure 10:
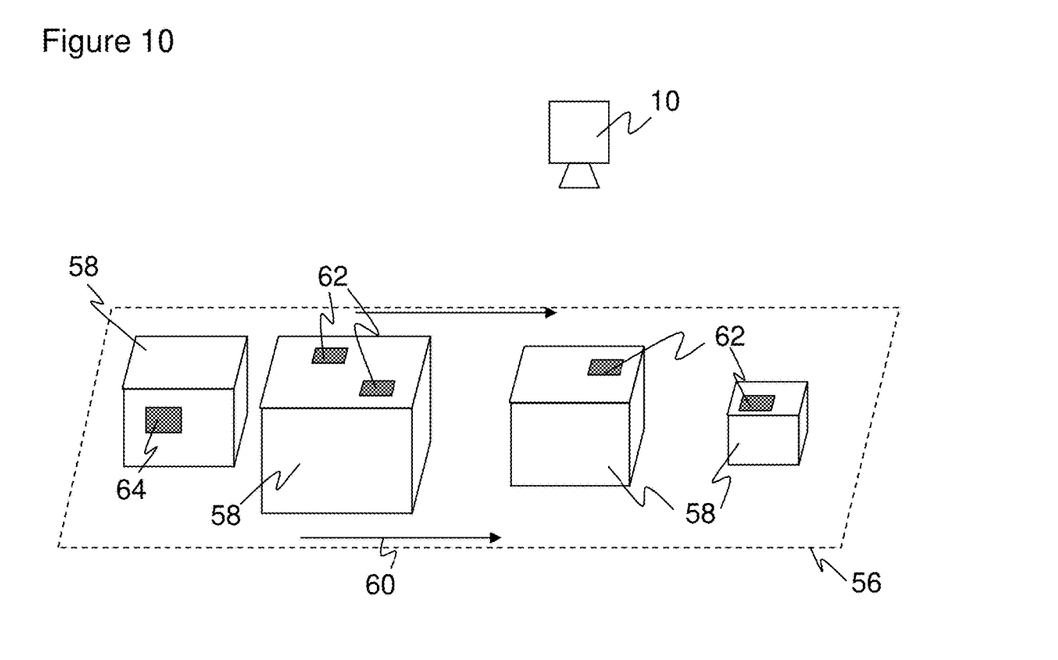
FIG. 10 a schematic, three-dimensional illustration of the exemplary application of an optoelectronic sensor according to the invention above a conveyor belt.

Finally, FIG. 10 shows a possible application of the sensor 10 when mounted on a conveyor belt 56 that conveys objects 58 through the recording region 12 of the sensor 10, as indicated by the arrow 60. The objects 58 may bear code regions 62 on their outer surfaces. The task of the sensor 10 is to record properties of the objects 58 and, in a preferred use as a code reader, to detect the code regions 62, read out the codes applied there, decode them, and assign them to the respective associated object 58. In order to also detect laterally attached code regions 64, additional sensors 10 not shown are preferably used from different perspectives.

The invention claimed is:

1. An optoelectronic sensor comprising:
   a light receiver;
   receiving optics in front of the light receiver; and
   a focus adjustment unit having an actuator and configured to move the light receiver, wherein the focus adjustment unit comprises a parallel guide having at least one flexible retaining element and moving the light receiver in a constant orientation on an optical axis of the receiving optics,
   wherein the at least one flexible retaining element comprises a thermally-conductive layer, and
   wherein the at least one flexible retaining element further comprises two metal layers, the thermally-conductive layer being positioned therebetween.

2. The sensor according to claim 1,
   wherein the actuator comprises a stepper motor or a moving coil.

3. The sensor according to claim 1,
   wherein the sensor comprises a position sensor for determining the position of the actuator, the parallel guide, or the light receiver.

4. The sensor according to claim 1,
   wherein the light receiver is arranged on a printed circuit board comprising at least one flexible section.

5. The sensor according to claim 4,
   wherein the printed circuit board comprises rolled copper at least in the flexible section.

6. The sensor according to claim 1,
   wherein the parallel guide comprises a fixed first bearing and an opposite, movable second bearing, and wherein the flexible retaining element is mounted with a first side in the first bearing and with an opposite second side in the second bearing.

7. The sensor according to claim 6,
   wherein the light receiver is at least indirectly rigidly connected to the second bearing and flexibly or not at all connected to the first bearing.

8. The sensor according to claim 1,
   wherein the at least one flexible retaining element is configured as a frame around the light receiver.

9. The sensor according to claim 1,
   wherein the at least one flexible retaining element comprises at least one leaf spring.

10. The sensor according to claim 1,
    wherein the parallel guide comprises two flexible retaining elements, and wherein the light receiver is arranged between the two flexible retaining elements.

11. The sensor according to claim 1,
    wherein the at least one flexible retaining element comprises a thermally-conductive metal.

12. The sensor according to claim 11,
    wherein the thermally-conductive metal comprises copper or a copper-beryllium alloy.

13. The sensor according to claim 1,
    wherein the at least one flexible retaining element comprises at least one rigid region in which the material is thickened.

14. The sensor according to claim 13,
    wherein the material is thickened by means of at least one additional metal strip.

15. The sensor according to claim 1,
    wherein the thermally-conductive layer comprises a graphite foil.

16. The sensor according to claim 1,
    comprising a control and evaluation unit configured to read out code information of a code recorded in image data acquired with the light receiver.

17. A method for adjusting the focus of an optoelectronic sensor comprising a light receiver and receiving optics arranged in front of the light receiver, the method comprising:
    moving the light receiver by means of a focus adjustment unit using an actuator, wherein the focus adjustment unit moves the light receiver in constant orientation on an optical axis of the receiving optics by means of a parallel guide having at least one flexible retaining element,
    wherein the at least one flexible retaining element comprises a thermally-conductive layer, and
    wherein the at least one flexible retaining element further comprises two metal layers, the thermally-conductive layer being positioned therebetween.

18. The method according to claim 17,
    wherein the thermally-conductive layer comprises a graphite foil.

* * * * *